Patented June 11, 1935

2,004,436

UNITED STATES PATENT OFFICE 2,004,436

MATCH

Alphons O. Jaeger, Mount Lebanon, Pa., assignor, by mesne assignments, to American Cyanamid & Chemical Corporation, a corporation of Delaware No Drawing. Application December 9, 1931, Serial No. 579,987

4 Claims. (Cl. 52—25)

This invention relates to improvements in pyrotechnic and match compositions and more specifically to methods of protecting such products against deterioration from moisture.

According to the invention compositions such as matches, both safety matches and those of the strike anywhere variety as well as pyrotechnic compositions such as fireworks and explosives are protected from moisture by spraying, dipping or otherwise coating them with compositions containing synthetic resinous materials. It has been proposed to use paraffins and waxes for similar purposes but these are open to many objections since they tend to soften in the presence of heat and require quite a bulky coating to effect the desired purpose. Synthetic resinous materials, on the other hand, whether taken up in solvents to form lacquers or used as such, can be much more effective in lesser amounts and the wide range of choice permits obtaining a material exactly suited for each individual purpose.

It has also been proposed to use nitrocellulose as a coating composition but the nitrocellulose is not desirable in most cases as it is too violently combustible and requires excessive cost in solvents owing to the extraordinary viscosity of nitrocellulose solutions as compared to solutions of synthetic resins.

The invention is not limited to any definite class of synthetic resinous materials, but on the contrary any desired synthetic resin or mixture of such resins may be employed to produce suitable protective coatings. Such substances are polyhydric alcohol-polybasic acid resins, phenolaldehyde, phenol-furfural and urea resins, nitrocellulose resins, coumarone resins, indene resins, vinyl resins, styrol resins, or mixtures of these are especially useful and present the added advantages of low initial cost and solubility in cheap solvents. While in many cases unmodified resins such as the above may be suitable, a closer adjustment of the desired properties to the requirements of the particular pyrotechnic or match to be coated may be obtained by the use of modified resins. For example, the polyhydric alcohol-polybasic acid resins may be modified by the incorporation during their preparation of aliphatic dibasic acids such as succinic, maleic or adipic acids or monobasic acids such as benzoic, abietic, lactic, salicylic, fat acids, etc., as well as balsam, rosin, copal, dammar and other components of the modified glyptal resins sold on the market as "Rezyls". Other modifying agents may also be used, such as, for example, the phthalides such as those described in my copending applications Serial No. 551,798 filed July 18, 1931 and Serial No. 552,075 filed July 20, 1931, which are well suited for use in the present invention.

Similarly, an excellent class of coating materials can be obtained by combinations of the various classes of resins, either modified or unmodified. As a result of such mixtures the various outstanding physical properties of the different resins are combined, for example the stability, softness and non-inflammability of the polyhydric alcohol polybasic acids serve to modify the brittle, hard, highly inflammable nitrocellulose resins to produce a coating material which will burn in the presence of a match flame but will not tend to ignite spontaneously and which will produce a sufficiently hard and flexible coating to protect the match during shipping and use. Similarly, the hard, dense and non-inflammable phenolaldehyde resins may be combined with the nitrocellulose resins, with or without the addition of glyptal resins.

A further modification of the coating by incorporation of plasticizers or softeners is also of value. Almost any of the usual softening agents for resinous compositions may be used for this purpose, high boiling esters, e. g. phthalic esters such as diethyl phthalate, phthalides, esters and salts of keto aromatic acid, tricresyl phosphate and the like being particularly useful. Additional softness may be obtained by physically incorporating oils, fats or waxes such as beeswax, paraffin, stearine, etc., into the resin, which may also contain other softeners and may be modified or unmodified.

Resinous materials such as those described constitute a decided improvement over other protective coatings, for their stability, hardness and high resistance to moisture permits a much thinner coating to be used. So thin is this coating that upon striking the match or upon ignition of other pyrotechnic compositions the thin protective coating is quickly worn or burned through, and consequently the striking quality of matches and the ready ignition of other pyrotechnics is not impaired.

In addition to their protective action, the coating compositions used in the present invention are excellently suited for the incorporation of dyes, thus greatly improving the appearance of the product. Almost any desired type of dye may be used, those resulting from the condensation of quinones such as alphanaphthoquinone with amines such as aniline being excellently suited by reason of their ready solubility. Soluble color lakes, such as those resulting from the reaction of solutions of metallo-organic compounds in organic solvents with solutions of lake forming dyes, as described in the co-pending application of Daniels and Jaeger Serial No. 503,855 filed Dec. 20, 1930, may also be used for this purpose and yield brilliantly colored coatings.

The invention will be further illustrated by the following examples which are for illustrative purposes only and to which it is not limited.

Example 1

A modified glyptal resin is prepared by heating a mixture of 202 parts phthalic anhydride, 40.5 parts phthalide and 92 parts glycerin for 2–3 hours at 180° C. or until the desired degree of esterification has been reached. The product, in molten state or dissolved in alcohol, is coated onto ordinary kitchen or "strike anywhere" matches, by dipping the match heads into the liquid. Of course the entire match may be so coated, but usually a coating over the match head is sufficient. After hardening of the resin the matches may be immersed in water for one-half hour or longer and will still light when scratched against a rough surface.

The proportion of phthalide to phthalic anhydride may be varied in order to vary the hardness of the resinous coating. Thus, for example, a slightly softer resin is produced by using 60.5 parts of phthalide and 191 parts phthalic anhydride in the above preparation, and still greater plasticity is obtained by using 82 parts phthalide, 180 parts phthalic anhydride to 92 parts glycerin. Plasticizers such as diethyl phthalate may also be added to the solution if desired.

Corresponding amounts of other modifying agents may also be used, such as succinic acid, benzoic acid, cottonseed oil, and other fat acids, etc. By this means, resinous coatings of any desired degree of hardness may be obtained. A dye, such as 2-anilidonaphthoquinone may be added in small amounts to give a red color to the coating if desired.

Example 2

A mixture of 90 parts by weight of glycerin, 195 parts phthalic anhydride and 18–24 parts rosin are heated to 170–185° C. until reaction ceases and a clear product is obtained. The resin so obtained is dissolved in acetone, amyl acetate or an alcohol and 50–75 parts nitrocellulose, cellulose acetate or cellulose ether, are stirred in. The solution is thinned to the proper consistency, preferably using benzol, toluol or other cheap solvent, and is applied to safety matches, either of the cardboard variety or those having a wooden stick. The coating, after drying in air, is hard and brilliant and protects the match against moisture. Similarly, a thin coating may be applied to the striking surface on the match container to prevent softening and deterioration by moisture.

The coating composition may be made more flexible by the addition of suitable plasticizers such as high boiling esters, e. g., diethyl or dibutyl phthalate; or phthalide, substituted phthalides or hydrogenated phthalides may be used. Esters of keto aromatic acids, such as the methyl, ethyl or propyl esters of benzoyl benzoic or naphthoyl benzoic acid may also be used as plasticizers.

Similar coating compositions may be applied to other pyrotechnics such as roman candles, skyrockets, pinwheels, stick dynamite, flares, torpedoes, percussion caps, fuses, etc., by treating with suitable solutions, drying and hardening.

Example 3

A soluble Bakelite or phenol-formaldehyde resin is dissolved in amyl acetate, acetone, fusel oil or mixtures of these, with or without the addition of benzol, toluol or other cheap hydrocarbon solvents. 6–8% diethyl or dibutyl phthalate are added as plasticizer and the composition is applied to matches of any kind in the usual manner. After drying and hardening a brittle coating is produced, which adheres well but is quickly worn through upon striking the match.

If desired, cellulose plastics such as cellulose acetate, cellulose ethers, etc. may be dissolved in the solvent in amounts up to 40–50% of the phenol-formaldehyde resin. Similarly, artificial plastics, plastics of other types such as vinyl resins, urea resins, etc. may be used if desired.

What is claimed as new is:

1. A match, the head of which is provided with a coating comprising as a major constituent a synthetic resin selected from the group consisting of polyhydric alcohol-polybasic acid resins and phenol-aldehyde resins, said coating being substantially impervious to moisture but being so thin as to have no effect on the striking qualities of the match.

2. A match, the head of which is provided with a coating comprising as a major constituent a plasticized synthetic resin selected from the group consisting of polyhydric alcohol-polybasic acid resins and phenol-aldehyde resins, said coating being substantially impervious to moisture but being so thin as to have no effect on the striking qualities of the match.

3. A match, the head of which is provided with a coating comprising as a major constituent a plasticized glycerol-phthalic anhydride resin, said coating being substantially impervious to moisture but being so thin as to have no effect on the striking qualities of the match.

4. A match, the head of which is provided with a coating comprising as a major constituent a synthetic resin consisting of an ester of glycerol with a plurality of organic acids, at least one of which is a polybasic acid, said coating being substantially impervious to moisture but being so thin as to have no effect on the striking qualities of the match.

ALPHONS O. JAEGER.